(12) United States Patent
Hook et al.

(10) Patent No.: US 6,785,315 B1
(45) Date of Patent: Aug. 31, 2004

(54) MOBILE TACTICAL HIGH ENERGY LASER WEAPON SYSTEM AND METHOD FOR GENERATING A HIGH ENERGY LASER BEAM

(75) Inventors: Dale L. Hook, Rancho Palos Verdes, CA (US); Josef Shwartz, Beverly Hills, CA (US); Jeffery L. Sollee, El Segundo, CA (US); Ethan W. Brigham, Rancho Santa Margarita, CA (US); Milton H. Gran, Fullerton, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 220 days.

(21) Appl. No.: 09/962,629

(22) Filed: Sep. 24, 2001

(51) Int. Cl.$^7$ .............................................. H01S 3/223
(52) U.S. Cl. ............................. 372/55; 372/89; 372/109
(58) Field of Search ............................. 372/55, 89, 109

(56) References Cited

U.S. PATENT DOCUMENTS

| | | | | |
|---|---|---|---|---|
| 3,623,145 A | * | 11/1971 | Gregg et al. ................... | 372/89 |
| 3,701,045 A | * | 10/1972 | Bronfin et al. ............... | 331/94.5 |
| 3,832,650 A | * | 8/1974 | Roberts ....................... | 331/94.5 |
| 3,928,821 A | * | 12/1975 | Gregg et al. ................... | 372/89 |
| 4,517,676 A | * | 5/1985 | Meinzer et al. ................ | 372/89 |
| 5,033,058 A | * | 7/1991 | Cabaret et al. ................ | 372/75 |
| 5,384,802 A | * | 1/1995 | Bushman ....................... | 372/89 |
| 5,774,488 A | * | 6/1998 | Kmetec ........................ | 372/69 |
| 6,459,717 B1 | * | 10/2002 | Henshaw et al. .............. | 372/58 |

OTHER PUBLICATIONS

Leroy E. Wilson and Dale L. Hook, "Deuterium Fluoride CW Chemical Lasers," AIAA 9$^{th}$ Fluid and Plasma Dynamics Conference, San Diego, California, Jul. 14–16, 1976, Paper No. 76–344.

H. H. Mueggenburg and D. C. Rousar, "Platelet Injector Design and Development History," AIAA Technical Paper, May 17, 1991.

H. H. Mueggenburg, et al., "Platelet Actively Cooled Thermal Management Devices," AIAA, Jun. 24, 1992.

Dale Hook, et al., "An Ejector System for Space Simulation of the Alpha Laser," AIAA 23$^{rd}$ Plasmadynamics & Lasers Conference, Nashville, TN, Jul. 6–8, 1992, Paper No. 92–2981.

\* cited by examiner

*Primary Examiner*—Don Wong
*Assistant Examiner*—Leith A Al-Nazer
(74) *Attorney, Agent, or Firm*—Noel F. Heal

(57) ABSTRACT

A laser weapon system using a high energy deuterium fluoride (DF) or hydrogen fluoride (HF) laser, for which all necessary reactants and other materials are carried on an easily movable vehicle. Reactant gases are stored mixed with a diluent gas, such as helium, for ease of handling and to provide nearly ideal gas behavior. Cooling water for the laser is also employed in a high pressure steam generator that uses diesel fuel and oxygen to produce heat. Apart from a fluorine generator, the system uses only four storage tanks for reactant gases.

17 Claims, 4 Drawing Sheets

MOBILE TACTICAL HIGH ENERGY LASER WEAPON SYSTEM AND METHOD FOR GENERATING A HIGH ENERGY LASER BEAM

BACKGROUND OF THE INVENTION

The present invention relates generally to high-energy lasers used as weapons and, more particularly, to chemical lasers, such as DF (deuterium fluoride) lasers, used as defensive tactical weapons to intercept airborne devices considered to be military threats, such as artillery rockets or artillery shells of various types. Although high-energy lasers have long been considered as the ultimate defensive weapon to in, destroy airborne threats before they reach their intended targets, prior to this invention no-one has made or even proposed a design for a chemical laser powerful enough to perform this function and yet compact enough to permit the weapon to be readily deployed and provide mobile protection for troops in the field.

The capability of high energy lasers to shoot down artillery rockets in mid-flight has been demonstrated by the US Army using a system referred to as the THEL ACTD (Tactical High Energy Laser Advanced Concept Technology Demonstrator). This system is housed in multiple cargo containers 8'×8'×40' (approximately 2.4 m×2.4 m×12 m), and requires a massive concrete slab for operational stability. The needed chemical reactants, $C_2H_4$, $NF_3$, $D_2$, combustor helium and cavity helium, were all stored in separate high-pressure tanks. Reactant flowing from the tanks was controlled by large digital flow control valves. The valves used a helium supply and regulation system. As diluents and reactants are removed from their supply tanks, flow control is rendered more difficult as the tank pressure and temperature of the remaining fluid fall toward the critical point. For helium and $D_2$, the density of the remaining gas increases and the expulsion efficiency is reduced. For $C_2H_4$ and $NF_3$, the problem is much greater in that, during the blowdown process, the gases approach the critical temperature and pressure, and their density increases in a nonlinear fashion, leaving most of the gas in the tank. This results in a requirement for the tanks to be much larger than they would need to be for ideal gas behavior.

As blowdown of the tanks and expulsion of the gases continues, the compressibility of the non-ideal gases changes drastically, making flow control more difficult. If the temperature of the $C_2H_4$ is allowed to drop below the critical temperature in the supply lines, condensation to the liquid state can occur, which would lead to system failure. This difficulty necessitates thermal control of the supply tanks, reactant supply lines and valve bodies.

The helium diluent must be mixed with the combustor and cavity reactant in prescribed amounts before injection into the combustor and laser cavity. This necessitates incorporation of inline mixers downstream of the flow controllers, which increases system complexity. Unfortunately, the system's manifold volume requirements, needed to properly sequence the flows consumes reactants that could otherwise be usefully employed for lasing.

Another difficulty inherent to the THEL ACTD system is that it utilizes 70% hydrogen peroxide ($H_2O_2$) to provide high temperature/high pressure motive steam for maintaining sub-atmospheric pressure in the lasing cavity. The $H_2O_2$ is stored in a large 2,000-gallon (approximately 7,500-liter) tank, and it has some very onerous handling requirements. The tank may be of stainless steel, but if so it must be emptied after approximately seven days of exposure. To be useful, the $H_2O_2$ storage tank must include a liner of appropriate material, such as teflon, and the valves must be of a special material, such as zirconium. In operation, the THEL ACTD hydrogen peroxide tank must be pressurized to 800 psia, using helium as the pressurizing gas. This arrangement not only requires a very large helium supply tank and pressure regulation system, but raises safety concerns that require the hydrogen peroxide tank to be depressurized when personnel are nearby. Repressurizing the large supply tank quickly depletes the helium supply.

THEL ACTD uses silver based catalyst decomposition engines to decompose $H_2O_2$. These decomposition engines must be operated at a temperature fixed by the thermochemistry of 70% peroxide. Unfortunately, the fixed temperature is insufficient, in many conditions, to result in an invisible plume. Moreover, the decomposition engines have proven to be unreliable to operate and expensive to manufacture. In the THEL ACTD system, twenty decomposition units were needed, each with its own on-off valves, pressure instrumentation, and temperature instrumentation. A failure of any decomposition unit causes the system to fail.

THEL ACTD is a large laser weapon demonstrator which cannot be easily moved from one site to another. It would be highly desirable to provide a mobile tactical high energy laser (MTHEL), preferably one that is about five times smaller in size and weight than the THEL ACTD, such that the laser could be easily moved and set up for operation in a matter of minutes instead of days. It would also be highly desirable to provide a mobile system that did not have the other disadvantages of the prior art, which were previously discussed. The present invention is directed to these ends.

BRIEF SUMMARY OF THE INVENTION

The present invention resides in a mobile tactical high energy laser system that is small enough to be carried by a single transport vehicle, such as a large truck or in a modular configuration. Briefly, and in general terms, the system of the invention comprises a deuterium fluoride (DF) or hydrogen fluoride (HF) laser assembly, for generating a high energy laser beam, the laser assembly including a gain generator assembly, a heat exchanger and an ejector; a nitrogen trifluoride ($NF_3$) supply coupled to the laser assembly; deuterium ($D_2$) or hydrogen ($H_2$) supply coupled to the laser assembly; a water supply coupled to supply cooling water to the laser assembly; a high pressure steam generator coupled to receive water from the heat exchanger of the laser assembly, and to provide steam to the ejector of the laser assembly; beam director optics, for directing the laser beam in a selected angular direction; and a vehicle on which all components of the high energy laser weapon system are mounted for operation and convenient transportation, the truck having a conventional engine.

More specifically, the water supply includes a water tank, a pump; and water lines connecting to supply cooling water from the water tank and pump to the gain generator assembly and the heat exchanger, and to carry water from the heat exchanger to the steam generator. In the presently preferred embodiment of the invention, the pump is powered by the conventional engine of the vehicle.

In accordance with one aspect of the invention, the high pressure steam generator includes a bipropellant combustion chamber; source of oxygen coupled to the combustion chamber; and a fuel pump coupled to a fuel tank for the conventional engine of the vehicle, to supply fuel to the combustion chamber. The conventional engine fuel, such as diesel oil, reacts with oxygen in the combustion chamber and produces heat that transforms water into high pressure steam.

In the preferred embodiment of the invention, the deuterium ($D_2$) or hydrogen ($H_2$) supply includes a first reactant-diluent mixture tank containing a mixture of deuterium ($D_2$) or hydrogen ($H_2$) heavily diluted with helium, whereby, the gas mixture behaves substantially like an ideal gas than it would if not diluted. Additionally, the system comprises a supply of nitrogen trifluoride ($NF_3$) stored in a second reactant-diluent mixture tank, also heavily diluted with helium; and a supply of ethylene ($C_2H_4$) stored in a third reactant-diluent mixture tank and also heavily diluted with helium. The second and third reactant-diluent mixture tanks are also coupled to the gain generator assembly. The system also includes a fluorine generator coupled to the gain generator assembly to supply fluorine ($F_2$) to the laser assembly for ignition purposes; and additional supply tanks for nitrogen fluoride ($NF_3$) and hydrogen ($H_2$) to the fluorine generator.

Ideally, the system also comprises four electrically actuated flow controllers connected between the gain generator assembly and the first, second and third helium-reactant mixture tanks, gaseous oxygen ($O_2$) for the steam generator respectively, and four shut-off valves, each connected in series with a respective one of the flow controllers.

In accordance with another aspect of the invention, the laser assembly includes an optical cavity in which lasing takes place, and a fast beam shutter located within the optical cavity, and operable to suppress lasing on command.

The invention may also be defined in terms of a method for generating a high energy laser beam on a movable vehicle. The method comprises the steps of supplying fluorine to the laser assembly; supplying other reactant gases to a deuterium fluoride (DF) or hydrogen fluoride (HF) laser assembly; initiating lasing in an optical cavity in the laser assembly and outputting a high energy laser beam from the optical cavity; supplying cooling water to the laser assembly; recovering heated cooling water from the laser assembly; generating high pressure steam from the recovered cooling water and supplying the steam to an ejector component of the laser assembly; and directing the high energy laser beam in a selected angular direction.

More specifically, the step of supplying other reactant gases includes storing each reactant gas in a storage tank with a diluent gas, for ease of handling and to provide more ideal gas behavior, and controlling the flow of each reactant gas to the laser assembly with an electrically actuated flow controller. The storing step includes storing deuterium or hydrogen in a tank with helium as a diluent; storing ethylene in a tank with helium as a diluent; and storing nitrogen fluoride in a tank with helium as a diluent The method of the invention may also comprise actuating a fast beam shutter installed in the optical cavity of the laser assembly, to terminate lasing as rapidly as possible.

It will be appreciated from the foregoing summary that the present invention represents a significant advance in the field of high energy laser weapon systems. In particular, the present invention provides an easily movable high energy laser system assembled onto a single vehicle, and without the need to store and use hydrogen peroxide at high pressures. In addition, the system makes efficient use of water for cooling and steam generation, and employs readily available diesel fuel and oxygen to generate high pressure steam for use in the laser assembly ejector. Other aspects and advantages of the invention will become apparent from the following drawings, taken in conjunction with following more detailed description.

DETAILED DESCRIPTION OF THE INVENTION

Figures 1A, 1B:
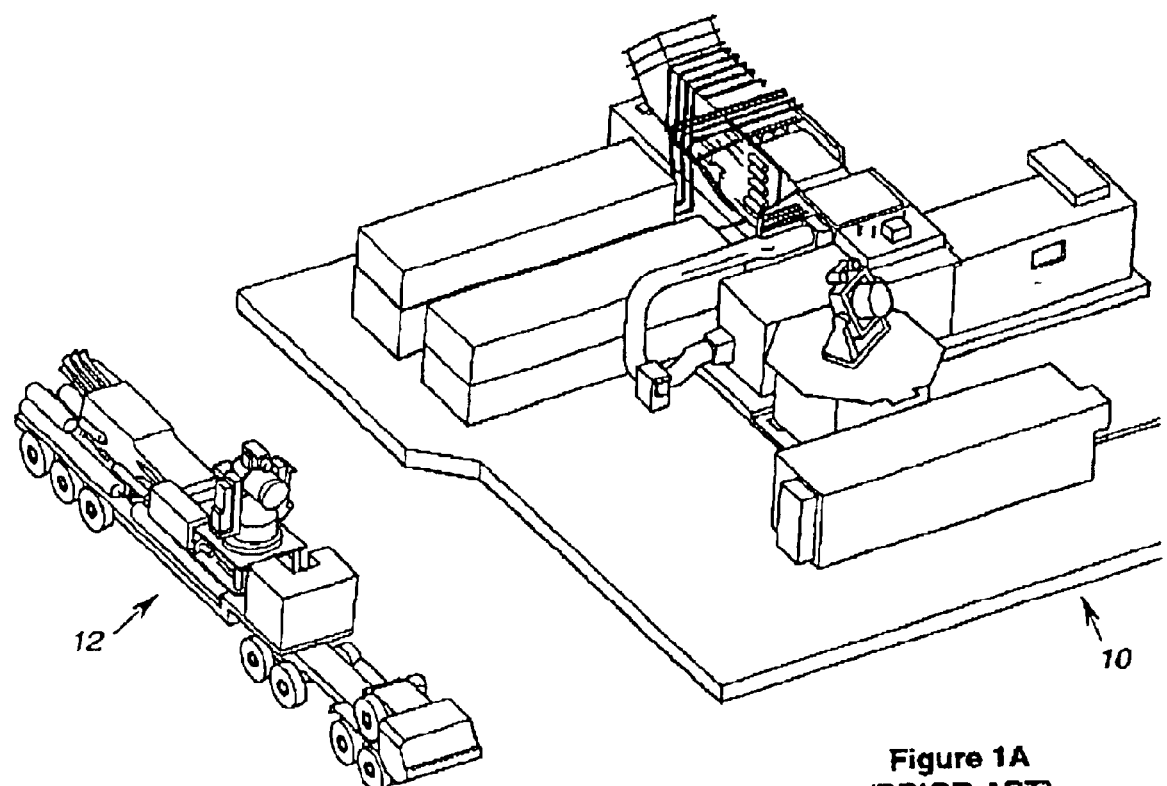
FIG. 1A is simplified perspective view of a high energy laser weapon system of the prior art.
FIG. 1B is a simplified perspective view of a mobile tactical high energy laser system in accordance with the present invention.

As shown in the drawings by way of illustration, the present invention pertains to high energy lasers used as ground-based air defense weapons, to shoot down short range missiles, rockets, mortars and artillery shells. The effectiveness of chemical lasers for this purpose has been demonstrated but, prior to this invention, the supporting structure and subsystems for a chemical laser have been too large to allow convenient movement of the laser from one location to another.

In accordance with the present invention, a mobile tactical high energy laser (MTHEL) weapon system is constructed in a manner that permits it be easily transported on a single truck or in a modular configuration. FIG. 1A depicts a tactical high energy laser (THEL) of the prior art, indicated generally by reference numeral 10. The THEL 10 includes multiple large modules installed on a concrete platform. By way of contrast, the MTHEL of the present invention is shown at 12 in FIG. 1B and is transportable and usable on a single large truck. In addition to its increased mobility and its requirement for only minimal site preparation, the MTHEL 12 makes more efficient use of fuel, which reduces the cost per operation, has a more rapid response time, and provides simplified operations, maintenance and logistics in comparison with the more cumbersome THEL 10 of the prior art. Further, the MTHEL 12 of the present invention has greatly reduced system complexity and vastly improved system reliability. Another feature is that the MTHEL system has an adjustable exhaust plume temperature that produces an invisible and environmentally safe exhaust plume.

Figure 2:
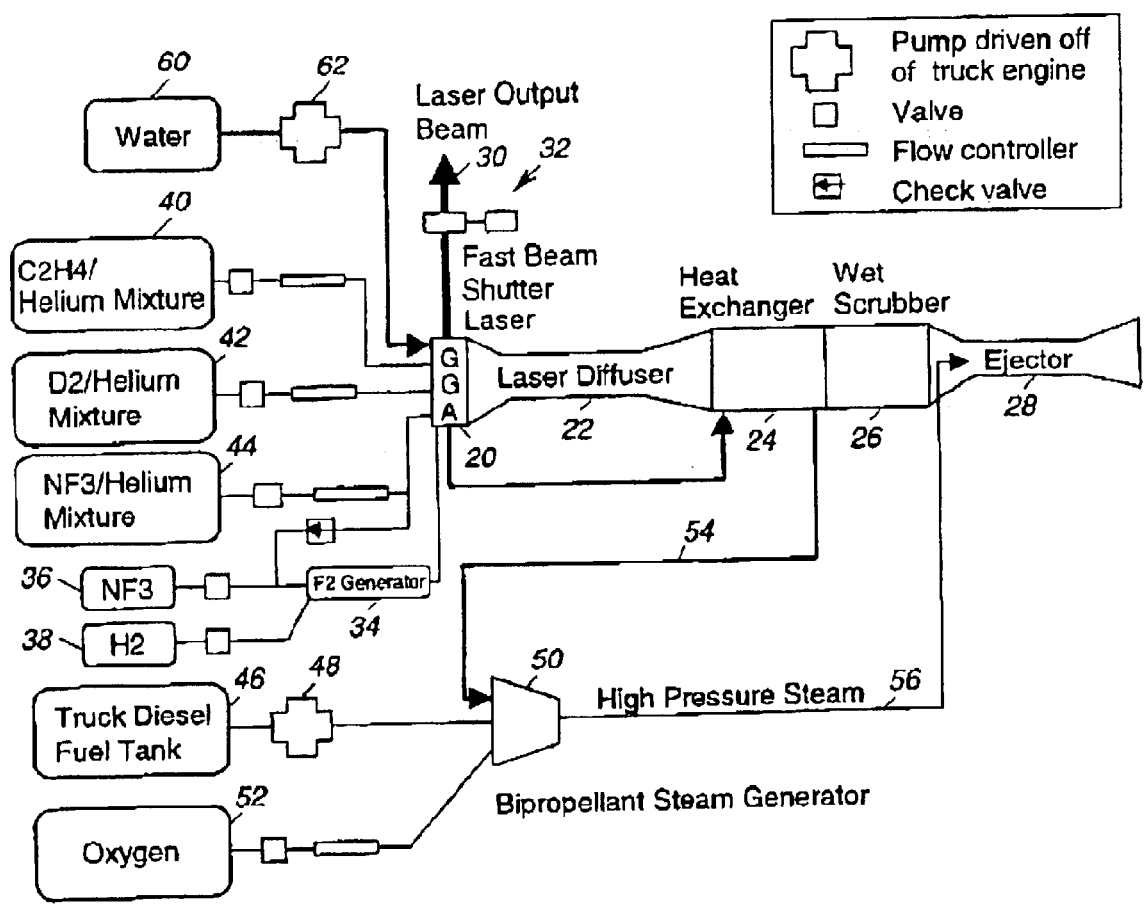
FIG. 2 is a schematic view showing the components of a high energy laser system in accordance with one embodiment of the present invention.

Principal components of the MTHEL 12 include, as shown in FIG. 2, include a gain generator assembly 20, a laser diffuser 22, a heat exchanger 24, a wet scrubber 26 and an ejector 28. A laser beam 30 is output from the gain generator 20, through a fast beam shutter 32, located within the optical cavity in which lasing takes place. Actuation of the beam shutter 32 functions to shut off lasing very rapidly. A high energy DF or HF chemical laser system generates a laser beam in the gain generator assembly 20. The principles of operation of DF or HF chemical lasers are well known and will not be explained in detail here. See, for example, "Deuterium Fluoride CW Lasers," by Leroy E. Wilson and D. L. Hook, American Inst. of Aeronautics and Astronautics (AIAA) Paper No. 76–344, presented at 9th Fluid and Plasma Dynamics Conf., San Diego, Calif., July 14–16, 1976. Chemical lasing operates on a population inversion produced, directly and indirectly, in the course of an exothermic chemical reaction between atomic fluorine (F) and deuterium ($D_2$). Excited DF molecules are produced by the exothermic reaction:

$$F+D_2+He \rightarrow DF(v=0,4)+D+He$$

The fluorine atoms are produced in a combustor section of the gain generator assembly 20, from a combustion reaction between excess nitrogen trifluoride ($NF_3$) or molecular fluorine ($F_2$) and ethylene ($C_2H_4$) or another hydrocarbon fuel (or $D_2$ in the case of an HF laser), with helium (He), to produce typically 90 percent F-atoms in a supersonic stream. In the system depicted in FIG. 2, molecular fluorine is generated in the gain generator 20. Ignition of the $NF_3$ and fuel in the gain generator 20 is achieved by the use of the fluorine gas generator 34, which receives its reactants from separate supplies 36 and 38 of nitrogen fluoride and hydrogen, respectively. Deuterium ($D_2$) is added to the supersonic stream of atomic fluorine in a bank of nozzles in the gain generator assembly, and the exothermic reaction mentioned above takes place at the exit plane of the nozzle bank, in a cavity that in part defines an optical resonator. The resulting optical beam derives its power from the combustion process, and operates in continuous wave (CW) mode so long as the combustion process continues and the various gases and diluents are supplied to the gain generator assembly.

Basically, the gain generator assembly 20 contains a laser cavity and cavity injectors for the introduction deuterium ($D_2$) or ($H_2$), atomic fluorine (F) and other gases. The gain generator assembly also includes reactant manifolds and a high-pressure combustor that produces atomic fluorine required for lasing. The gain generator assembly 20 is preferably constructed in accordance with the principles disclosed in pending U.S. patent application Ser. No. 09/886,765 entitled "High Energy DF Chemical Laser Gain Generator and Related Method for its Fabrication."

An important aspect of the invention is that diluents and reactants required for operation of the laser are premixed in storage tanks, which not only reduces the number of tanks needed but also improves the ideal gas behavior of the stored materials. More specifically, when a relatively large amount of helium is mixed with a non-ideal gas, such as nitrogen fluoride ($NF_3$) or ethylene ($C_2H_4$), the mixture begins to behave very much like an ideal gas. Compressibility remains very nearly constant at the value for helium over the pressure and temperature ranges of interest. As a result, flow control and tank expulsion efficiency are much improved, mixture ratio control is improved and laser efficiency and predictability are also improved. The number of storage tanks is reduced to four: a $C_2H_4$/helium tank 40, a $D_2$/helium tank 42, an $NF_3$/helium tank 44, and a gaseous oxygen tank 52. The number of valves and flow controllers is correspondingly reduced, all of which reduces system complexity. Furthermore, the highly diluted $NF_3$ system is safer to handle at high pressure. Another consequence is that the time required for sequencing flows, and the manifold fill time are greatly reduced, providing a response time improvement by a factor of as high as four in comparison with the prior art.

A further reduction in complexity results from the use of truck diesel fuel from a diesel fuel tank 46 to generate high pressure steam for supply to the laser ejector 28. The diesel fuel is drawn by a pump 48 and supplied to a bipropellant steam generator 50, along with oxygen from an oxygen tank 52. Heated water from the heat exchanger 24 is supplied to the steam generator 50 over line 54, and high pressure steam is output from the generator over line 56 to the ejector 28.

Water for the steam generator 50 is first pumped from a water tank 60, by another pump 62, into the gain generator assembly 20 and the laser diffuser 22 for cooling purposes. Water recovered from the gain generator assembly 20 and laser diffuser 22 then passes through line 64 to the heat exchanger 24, and is finally injected into the steam generator after passing through line 54. In the prior art, cooling water was pressurized to 800 psia and then the heated water was dumped. In the system of the present invention, heated cooling water serves the additional purpose of generating steam, which is used to drive an ejector pump in the laser assembly. This arrangement eliminates the need to store hydrogen peroxide. The need to pressurize helium is also eliminated by the use of diesel-engine-driven pumps. Gaseous oxygen for the steam generator is readily available and easier to handle than hydrogen peroxide.

Figure 3:
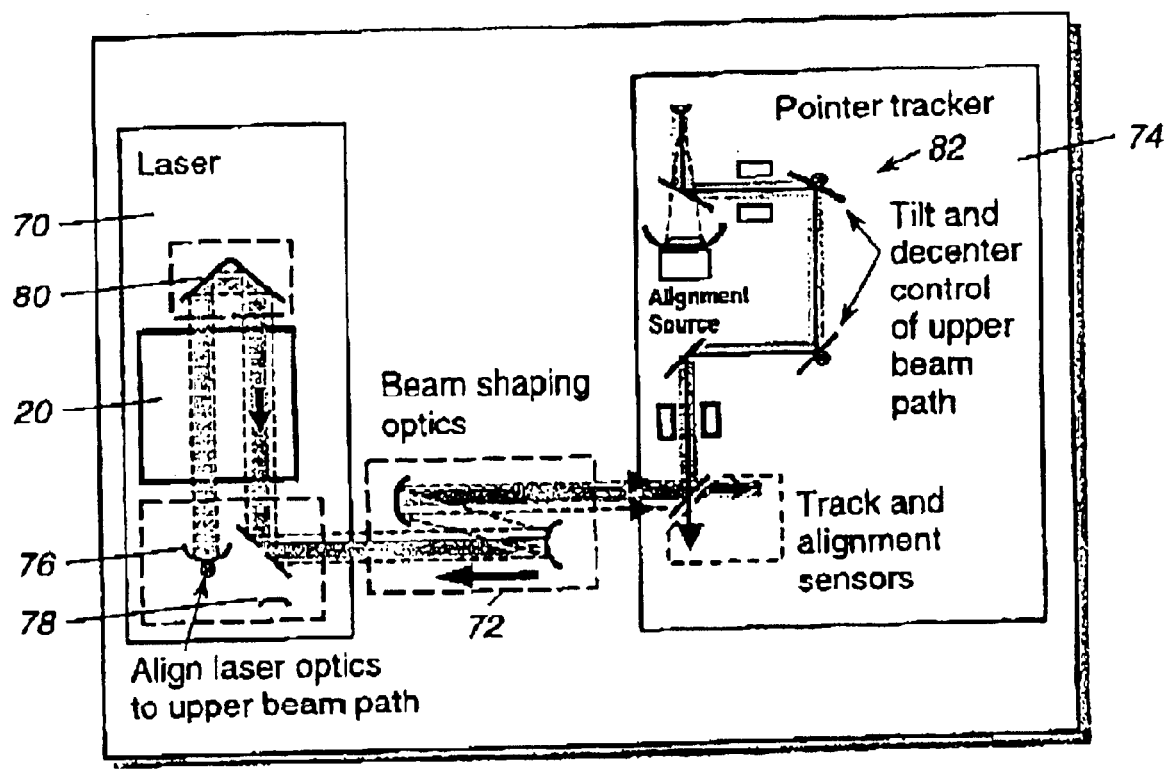
FIG. 3 is a schematic view showing the optical components of the system in general.
Figure 4:
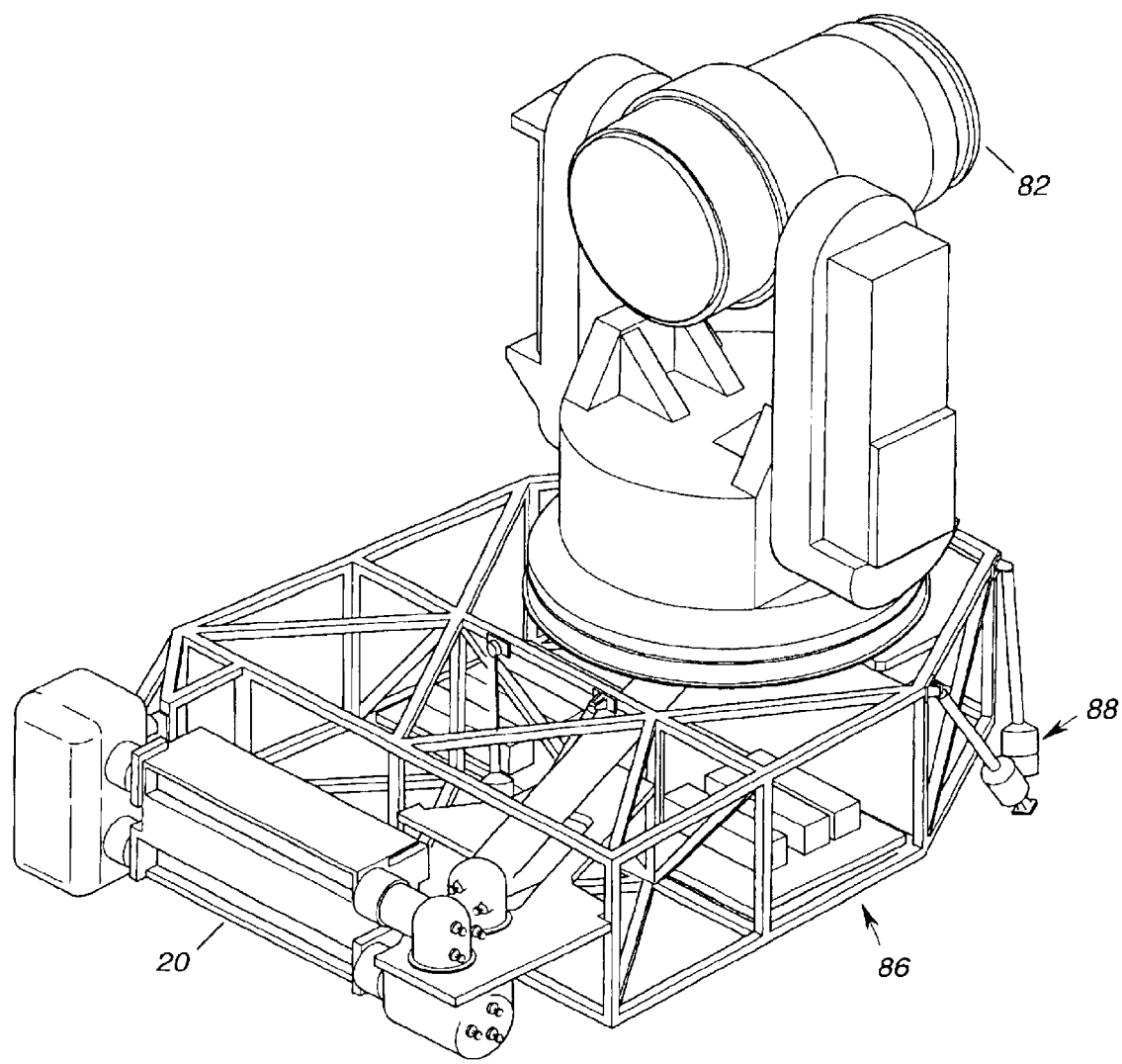
FIG. 4 is a diagrammatic view of the optical components and mounting arrangement of the system.

FIG. 3 depicts the beam directing optical components of the high energy laser system. There are three principal components: the laser optics 70, beam shaping optics 72 and pointing and tracking optics 74. The details of the beam directing optics are not part of the present Invention and are described here only briefly for completeness. In the laser optics 70, right is reflected back and forth through the gain generator assembly 20, between a concave mirror 76 and a convex mirror 78, and Is also reflected from an intermediate trihedral mirror 80. The output beam is processed by the beam shaping optics 72, which adjusts the cross-sectional shape of the beam, and then proceeds to the pointing and tracking optics 74. The latter includes a telescope 82 movable about two separate axis, to slew the beam both in elevation and in azimuth angle. The beam operates in continuous-wave (CW) mode but is most efficiently operated only when needed, to conserve reactant or fuel. Accordingly, a technique for tracking targets is preferably included, to enable operation of the laser beam only when it is aligned with a desired target.

It will be appreciated from the foregoing that the present invention represents a significant Improvement over the cumbersome system of the prior art. In particular, the present invention provides a high energy laser beam from a conventional vehicle that can be easily moved between locations. It will also be appreciated that, although the invention has been described in detail for purposes of illustration, various modifications may be made without departing from the spirit and scope of the invention. Accordingly, the invention should not be limited except as by the appended claims.

What is claimed is:

1. A conveniently movable high energy laser weapon system, comprising:

a deuterium fluoride (DF) or hydrogen fluoride (HF) laser assembly, for generating a continuous wave (CW) high energy laser beam, the laser assembly including a gain generator assembly, a heat exchanger and an ejector;

a supply of nitrogen trifluoride ($NF_3$) coupled to the laser assembly;

a supply of combustor fuel coupled to the laser assembly;

a fluorine igniter coupled to the laser assembly;

a deuterium ($D_2$) or hydrogen ($H_2$) supply coupled to the laser assembly;

a water supply coupled to supply cooling water to the laser assembly;

a high pressure steam generator coupled to receive water from the heat exchanger of the laser assembly, to provide steam to the ejector of the laser assembly;

beam director optics, for directing the laser beam in a selected angular direction; and a vehicle on which all components of the high energy laser weapon system are mounted for operation and convenient transportation, the vehicle having a conventional engine.

2. A high energy laser weapon system as defined in claim 1, wherein the water supply includes:

a water tank;

a pump; and water lines connecting to supply cooling water from the water tank and pump to the gain generator assembly and the heat exchanger, and to carry water from the heat exchanger to the steam generator.

3. A high energy laser weapon system as defined in claim 2, wherein the pump is powered by the conventional engine of the vehicle.

4. A high energy laser weapon system as defined in claim 1, wherein the high pressure steam generator includes:

a bipropellant combustion chamber;

a source of oxygen coupled to the combustion chamber; and a fuel pump coupled to a fuel tank for the conventional engine of the vehicle, to supply fuel to the combustion chamber;

wherein the conventional engine fuel and oxygen react in the combustion chamber and produce heat that transforms water into high pressure steam.

5. A high energy laser weapon system as defined in claim 4, wherein the conventional vehicle engine is a diesel engine and the steam generator produces heat by combusting diesel fuel and oxygen in the combustion chamber.

6. A high energy laser weapon system as defined in claim 1, wherein:

the deuterium ($D_2$) or hydrogen ($H_2$) supply includes a first reactant-diluent mixture tank containing a mixture of deuterium ($D_2$) or hydrogen ($H_2$) heavily diluted with helium, whereby, the gas mixture behaves substantially like an Ideal gas than it would if not diluted.

7. A high energy laser weapon system as defined in claim 6, wherein:

the supply of nitrogen trifluoride ($NF_3$) is stored in a second reactant-diluent mixture tank and also heavily diluted with helium;

the supply of combustor fuel includes ethylene ($C_2H_4$) stored in a third reactant-diluent mixture tank and also heavily diluted with helium; and the second and third reactant-diluent mixture tanks are also coupled to the gain generator assembly.

8. A high energy laser weapon system as defined in claim 7, and further comprising:

a fluorine generator coupled to the gain generator assembly to supply fluorine ($F_2$) for ignition to the laser assembly; and additional supply tanks for nitrogen trifluoride ($NF_3$) and hydrogen ($H_2$) to the fluorine generator.

9. A high energy laser weapon system as defined in claim 8, and further comprising:

three electrically actuated flow controllers connected between the gain generator assembly and the first, second and third helium-reactant mixture tanks, respectively;

three shut-off valves, each connected in series with a respective one of the flow controllers; and a fourth flow controller to supply oxygen ($O_2$) for steam generation.

10. A high energy laser weapon system as defined in claim 1, wherein the laser assembly includes an optical cavity in which lasing takes place, and a fast beam shutter located within the optical cavity, and operable to suppress lasing on command.

11. A method for generating a continuous wave (CW) high energy laser beam on a movable vehicle, comprising the steps of supplying ignite fluorine to the laser assembly:

supplying other reactant gases to a deuterium fluoride (DF) or hydrogen fluoride (HF) laser assembly;

initiating lasing in an optical cavity in the laser assembly and outputting a high energy laser beam from the optical cavity;

supplying cooling water to the laser assembly;

recovering heated cooling water from the laser assembly;

generating high pressure steam from the recovered cooling water and supplying the steam to an ejector component of the laser assembly; and directing the high energy laser beam in a selected angular direction.

12. A method as defined in claim 11, wherein the step of supplying other reactant gases includes:

storing each reactant gas in a storage tank with a diluent gas, for ease of handling and to provide more ideal gas behavior; and controlling the flow of each reactant gas to the laser assembly with an electrically actuated flow controller.

13. A method as defined in claim 12, wherein the storing step includes:

storing deuterium or hydrogen in a tank with helium as a diluent;

storing ethylene in a tank with helium as a diluent; and storing nitrogen trifluoride in a tank with helium as a diluent.

14. A method as defined in claim 13, wherein the step of supplying igniter fluorine includes supplying nitrogen trifluoride and hydrogen to a fluorine generator.

15. A method as defined in claim 11, wherein the step of supplying cooling water includes:

pumping water from a water tank to the laser assembly; and recovering water from the laser assembly for use in the step of generating high pressure steam.

16. A method as defined in claim 15, wherein the step of generating high pressure steam includes:

combusting diesel fuel and oxygen to provide heat to generate steam from the cooling water obtained from the laser assembly.

17. A method as defined in claim 11, and further comprising:

actuating a fast beam shutter installed in the optical cavity of the laser assembly, to terminate lasing as rapidly as possible.

* * * * *